(12) United States Patent
Mohamadi

(10) Patent No.: US 9,316,733 B2
(45) Date of Patent: Apr. 19, 2016

(54) W-BAND, ULTRA-WIDE BAND (UWB) TRAJECTORY DETECTOR

(71) Applicant: Farrokh Mohamadi, Irvine, CA (US)

(72) Inventor: Farrokh Mohamadi, Irvine, CA (US)

(73) Assignee: Farrokh Mohamadi, Irvine, CA (US)

( * ) Notice: Subject to any disclaimer, the term of this patent is extended or adjusted under 35 U.S.C. 154(b) by 647 days.

(21) Appl. No.: 13/722,899

(22) Filed: Dec. 20, 2012

(65) Prior Publication Data

US 2016/0061949 A1   Mar. 3, 2016

Related U.S. Application Data

(60) Provisional application No. 61/583,123, filed on Jan. 4, 2012.

(51) Int. Cl.
| | |
|---|---|
| *G01S 13/89* | (2006.01) |
| *G01S 13/86* | (2006.01) |
| *G01S 13/88* | (2006.01) |
| *G01S 13/02* | (2006.01) |
| *G01S 7/02* | (2006.01) |
| *H01Q 1/28* | (2006.01) |

(Continued)

(52) U.S. Cl.
CPC ............... *G01S 13/89* (2013.01); *G01S 7/026* (2013.01); *G01S 13/0209* (2013.01); *G01S 13/86* (2013.01); *H01Q 1/28* (2013.01); *G01S 2013/468* (2013.01)

(58) Field of Classification Search
CPC .......... F41H 11/02; F41G 5/14; F41G 5/18; F41G 5/20; G01S 13/66; G01S 13/68; G01S 13/685; G01S 13/70; G01S 13/72; G01S 13/723; G01S 13/726; G01S 13/86; G01S 13/87; G01S 13/88; G01S 13/89; G01S 7/02; G01S 7/024; G01S 7/026; G01S 13/02; G01S 13/0209; G01S 13/06; G01S 13/46; G01S 2013/468; G01S 5/16; G01S 5/20; G01S 11/12; G01S 13/42; G01S 13/44; G01S 17/87; H01Q 1/27; H01Q 1/28
USPC ............... 244/3.11, 3.1–3.19; 342/21, 27, 28, 342/52–59, 61–67, 73–81, 104–115, 118, 342/146, 147, 175, 195, 126, 156, 188, 29, 342/159, 179, 89, 94–96, 176; 89/1.11; 235/400; 367/118, 124
See application file for complete search history.

(56) References Cited

U.S. PATENT DOCUMENTS 2,817,081 A  *  12/1957  Roberts .......................... 342/113
3,184,739 A  *   5/1965  Frederick et al. ............... 342/59

(Continued)

*Primary Examiner* — Bernarr Gregory
(74) *Attorney, Agent, or Firm* — Haynes and Boone, LLP

(57) ABSTRACT

An ultra-wideband (UWB) radar imaging system is carried by a mobile platform—such as an aircraft—the UWB radar imaging system including multiple UWB radar sensors; the UWB radar sensors transmitting a high resolution radar signal using an array of power amplifiers and corresponding polarizing antenna arrays to form spatial power combining and beam forming from each UWB radar sensor; and receiving reflections using an array of low noise amplifiers and corresponding antenna arrays to form spatial power combining from the reflections at each. UWB radar sensor; processing the radar sensor data from the UWB radar sensors by an imaging processor for detecting a ballistic projectile; and providing trajectory information of a detected ballistic projectile on a display. Trajectory modeling enables fusing the radar sensor data with optical or thermal imaging data and the trajectory information to display a probable source location of the detected ballistic projectile.

14 Claims, 10 Drawing Sheets

(51) Int. Cl.
*G01S 13/00* (2006.01)
*G01S 13/46* (2006.01)

(56) References Cited

U.S. PATENT DOCUMENTS

| | | | | |
|---|---|---|---|---|
| 3,295,128 | A * | 12/1966 | Canaday | G01S 13/44 235/400 |
| 3,351,936 | A * | 11/1967 | Feder | 342/59 |
| 3,378,835 | A * | 4/1968 | Mooney, Jr. et al. | 342/59 |
| 3,378,840 | A * | 4/1968 | Mooney, Jr. | 342/59 |
| 3,412,396 | A * | 11/1968 | Mooney, Jr. | 342/59 |
| 3,448,452 | A * | 6/1969 | Mooney, Jr. | 342/59 |
| 3,953,856 | A * | 4/1976 | Hammack | 342/126 |
| 3,996,590 | A * | 12/1976 | Hammack | 342/126 |
| 4,540,978 | A * | 9/1985 | Burns et al. | 342/59 |
| 4,751,511 | A * | 6/1988 | Komata | G01S 13/88 342/59 |
| 4,843,397 | A * | 6/1989 | Galati et al. | 342/59 |
| 4,992,796 | A * | 2/1991 | Apostolos | 342/156 |
| 5,097,267 | A * | 3/1992 | Raviv | 342/58 |
| 5,140,329 | A * | 8/1992 | Maughan | G01S 13/723 342/67 |
| 5,198,607 | A * | 3/1993 | Livingston et al. | 89/1.11 |
| 5,381,156 | A * | 1/1995 | Bock et al. | 342/126 |
| 5,424,744 | A * | 6/1995 | Westphal | 342/27 |
| 5,458,041 | A * | 10/1995 | Sun et al. | 89/1.11 |
| 5,464,174 | A * | 11/1995 | Laures | 244/3.11 |
| 5,631,654 | A * | 5/1997 | Karr | G01S 11/12 342/107 |
| 5,959,574 | A * | 9/1999 | Poore, Jr. | G01S 13/726 342/96 |
| 6,262,680 | B1 * | 7/2001 | Muto | G01S 13/723 244/3.1 |
| 6,563,763 | B2 * | 5/2003 | McNelis | G01S 5/20 367/124 |
| 6,633,253 | B2 * | 10/2003 | Cataldo | 342/195 |
| 6,870,503 | B2 | 3/2005 | Mohamadi | |
| 6,877,691 | B2 * | 4/2005 | DeFlumere et al. | 244/3.1 |
| 6,885,344 | B2 | 4/2005 | Mohamadi | |
| 6,963,307 | B2 | 11/2005 | Mohamadi | |
| 6,982,670 | B2 | 1/2006 | Mohamadi | |
| 7,109,911 | B1 * | 9/2006 | Cataldo | 342/159 |
| 7,126,541 | B2 | 10/2006 | Mohamadi | |
| 7,126,542 | B2 | 10/2006 | Mohamadi | |
| 7,126,554 | B2 | 10/2006 | Mohamadi | |
| 7,151,478 | B1 * | 12/2006 | Adams | G01S 13/86 244/3.1 |
| 7,312,763 | B2 | 12/2007 | Mohamadi | |
| 7,321,339 | B2 | 1/2008 | Mohamadi | |
| 7,339,659 | B1 * | 3/2008 | Kravitz | G01S 17/87 244/3.15 |
| 7,348,918 | B2 * | 3/2008 | Redano | 342/62 |
| 7,352,324 | B2 | 4/2008 | Mohamadi | |
| 7,394,047 | B1 * | 7/2008 | Pedersen | 244/3.1 |
| 7,414,577 | B2 | 8/2008 | Mohamadi | |
| 7,423,607 | B2 | 9/2008 | Mohamadi | |
| 7,504,982 | B2 * | 3/2009 | Berg et al. | 342/62 |
| 7,511,252 | B1 * | 3/2009 | Pedersen et al. | 244/3.1 |
| 7,522,641 | B2 | 4/2009 | Mohamadi | |
| 7,542,005 | B2 | 6/2009 | Mohamadi | |
| 7,548,205 | B2 | 6/2009 | Mohamadi | |
| 7,554,504 | B2 | 6/2009 | Mohamadi | |
| 7,610,064 | B2 | 10/2009 | Mohamadi | |
| 7,683,852 | B2 | 3/2010 | Mohamadi | |
| 7,697,958 | B2 | 4/2010 | Mohamadi | |
| 7,742,000 | B2 | 6/2010 | Mohamadi | |
| 7,782,247 | B1 * | 8/2010 | VanLaningham et al. | 342/118 |
| 7,791,556 | B2 | 9/2010 | Mohamadi | |
| 7,898,462 | B2 * | 3/2011 | Meyers et al. | 342/29 |
| 7,928,890 | B2 * | 4/2011 | Grizim et al. | 342/59 |
| 7,977,614 | B2 * | 7/2011 | Raviv | 244/3.11 |
| 8,674,276 | B2 * | 3/2014 | Rovinsky | 244/3.1 |

* cited by examiner

W-BAND, ULTRA-WIDE BAND (UWB) TRAJECTORY DETECTOR

CROSS REFERENCE TO RELATED APPLICATIONS

This application claims the benefit of priority from U.S. Provisional Patent Application No. 61/583,123, filed Jan. 4, 2012, which is incorporated by reference.

BACKGROUND

Embodiments of the present invention generally relate to radar imaging systems and, more particularly, to defensive radar detection of ballistic projectiles and determining the source of the projectiles using trajectory modeling.

There is a need, particularly in military combat scenarios, for example, for a sensor with augmented capabilities for detecting and classifying hostile weapons fire—such as ballistic (e.g., unguided) munitions coming in proximity to rotary wing aircraft or stationary targets. Such needs may also arise in situations where surveillance or security protection is desired—such as for police work, illegal border crossing, or smuggling scenarios. Sensor capabilities are needed that can provide situational awareness of hostile fire to an aircrew, for example, of a helicopter, or other personnel that may find themselves in an exposed position. A sensor is needed that can meet requirements for being low-observable, low power, light weight, and highly reliable. A sensor is needed that can provide the capability to detect, classify, and provide location information for hostile ballistic munitions fire at distances up to 100 meters from an aircraft or personnel station.

Figure 1A:
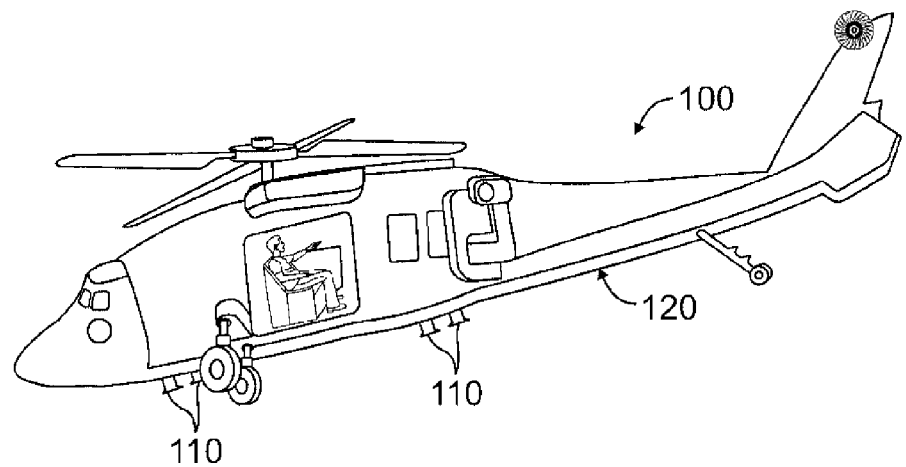
FIG. 1A is a perspective illustration of a system for radar detection of ballistic projectiles showing sensor locations according to one embodiment.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Broadly speaking, one or more embodiments provide radar imaging systems and methods for defensive radar detection of ballistic projectiles and tracking projectile trajectories for determining the source of the projectiles using trajectory modeling. Embodiments are useful, particularly in military combat scenarios, for detecting and classifying hostile weapons fire—such as ballistic (e.g., unguided) munitions coming in proximity to rotary wing aircraft or stationary targets. Embodiments provide radar sensors with augmented capabilities based on implementation of an ultra wide-band core (UWB), operating at the 3.0-6.0 giga-Hertz (GHz) band, that is enhanced and miniaturized based on spatial beam fainting and combining at V-band (e.g., about 40-75 GHz), E-band (e.g., including two bands of about 71-76 and 81-86 GHz), or W-band (e.g., about 75-110 GHz). One or more embodiments may include implementation of a planar active array transmitter (TX) fully integrated with an array of power amplifiers (PA) and corresponding antenna arrays to form spatial power combining and beam forming. One or more embodiments may include implementation of a planar active array receiver (RX) fully integrated with an array of low noise amplifiers (LNA) and corresponding antenna arrays to form spatial power combining from the narrow beam transmitter. Some embodiments provide further miniaturization of each sensor (generally 2 to 4 sensors, for example, may be used in each system) to operate at the W-band. For example, the system can employ a single sensor or a quad sensor (comprising, e.g., four sensors) for detection of 1 to 3 launched unguided munitions.

Embodiments may be useful in situations where surveillance or security protection is desired—such as for police work, illegal border crossing, or smuggling scenarios. Embodiments may include sensor capabilities that can provide situational awareness of hostile fire to an aircrew, for example, of a helicopter, or other combat or enforcement personnel that may find themselves in an exposed position. Embodiments may include sensors that can meet requirements for being low-observable (e.g., occupying from about 0.07 to 0.31 cubic feet ($ft.^3$)), low power (e.g., consuming from 2 to 100 Watts (W)), light weight (e.g., weighing from about 5 to 20 pounds (lb.)), and highly reliable and that can provide capability to detect, classify, and provide location information for hostile ballistic munitions fire at distances up to 100 meters from an aircraft or personnel station.

Many sonic based systems have been deployed to detect trajectory of rifle bullets, but use of such systems may be limited, however, by supersonic rifles, multi-path echoes, and noise of crowded public places and transportation vehicles. Thermal imaging has also been used to detect and trace supersonic bullets, but image processing is typically very complex in the presence of heat resources and smog, especially in day time and with high traffic clutter, An ultra wide-band (impulse) radar system, as in one or more embodiments can address such deficiencies.

In one or more embodiments, methods and systems are provided for: carrying an ultra-wideband (UWB) radar imaging system by a mobile platform—such as an aircraft or other vehicle—so that the UWB radar imaging system includes a plurality of radio frequency (RF) sensors; transmitting, by the UWB RF sensors, a high resolution radar signal using an array of power amplifiers and corresponding antenna arrays to form spatial power combining and beam forming from each RF sensor; and receiving reflections using an array of low noise amplifiers and corresponding antenna arrays to form spatial power combining from the reflections at each RF sensor; processing the radar sensor data from the plurality of sensors by an imaging processor for detecting a ballistic projectile; and providing trajectory information of a detected ballistic projectile on a display. Trajectory modeling enables fusing the radar sensor data with optical or thermal imaging data and the trajectory information of the detected ballistic projectile to provide a probable source location of the detected ballistic projectile on a display.

Figure 1B:
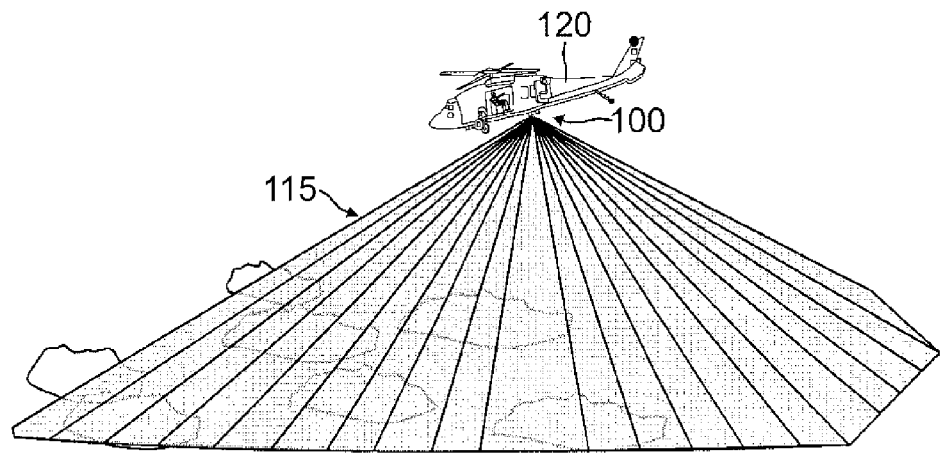
FIG. 1B is a perspective view illustrating a scanning capability of a system for radar detection of ballistic projectiles in accordance with one or more embodiments.

FIG. 1A illustrates an example of a radar sensor system 100 for radar detection of ballistic projectiles showing sensor locations 110 for mounting sensors 1300 (see FIG. 2) to an aircraft 120. FIG. 1B illustrates an example of scanning capability, represented by rays 115 illustrative of spatial beam forming and scanning of system 100 for radar detection and trajectory estimation of ballistic projectiles in accordance with one or more embodiments.

System 100 may, for example, provide capability of detecting motion of a 4 inch-by-4 inch target (e.g., a projectile, whether or not metallic) at 100 meters (m) away from the sensors (e.g. 100 m from aircraft 120) and speed of nearly 10 m/sec. For an aircraft 120 maintaining a safe distance (e.g., 2000 meters) above ground, for example, even a supersonic bullet will reach speeds of near zero before falling back to ground, and can be detected easily by radar sensor system 100.

In one embodiment up-converting and down converting the core processing capability of motion detection (at, e.g., 3-6 GHz) to V-band (at, e.g., 57-63 GHz) provides a miniaturization that can enhance the capability of detecting motion of a 4 inch-by-4 inch target at 100 m to detectability of a 3 inch-by-3 inch target at 100 m, as well as providing significant improvement in size reduction. In another embodiment, further implementation of a 32-by-32 element active antenna array with 16 power amplifiers operating in E-band (at, e.g., 81-86 GHz) may increase the detection sensitivity such that a supersonic sniper bullet can be detected 200 meters away from the aircraft 120 (e.g., helicopter) and can be traced back to the sniper in a range of about 2000 meters.

Figure 2:
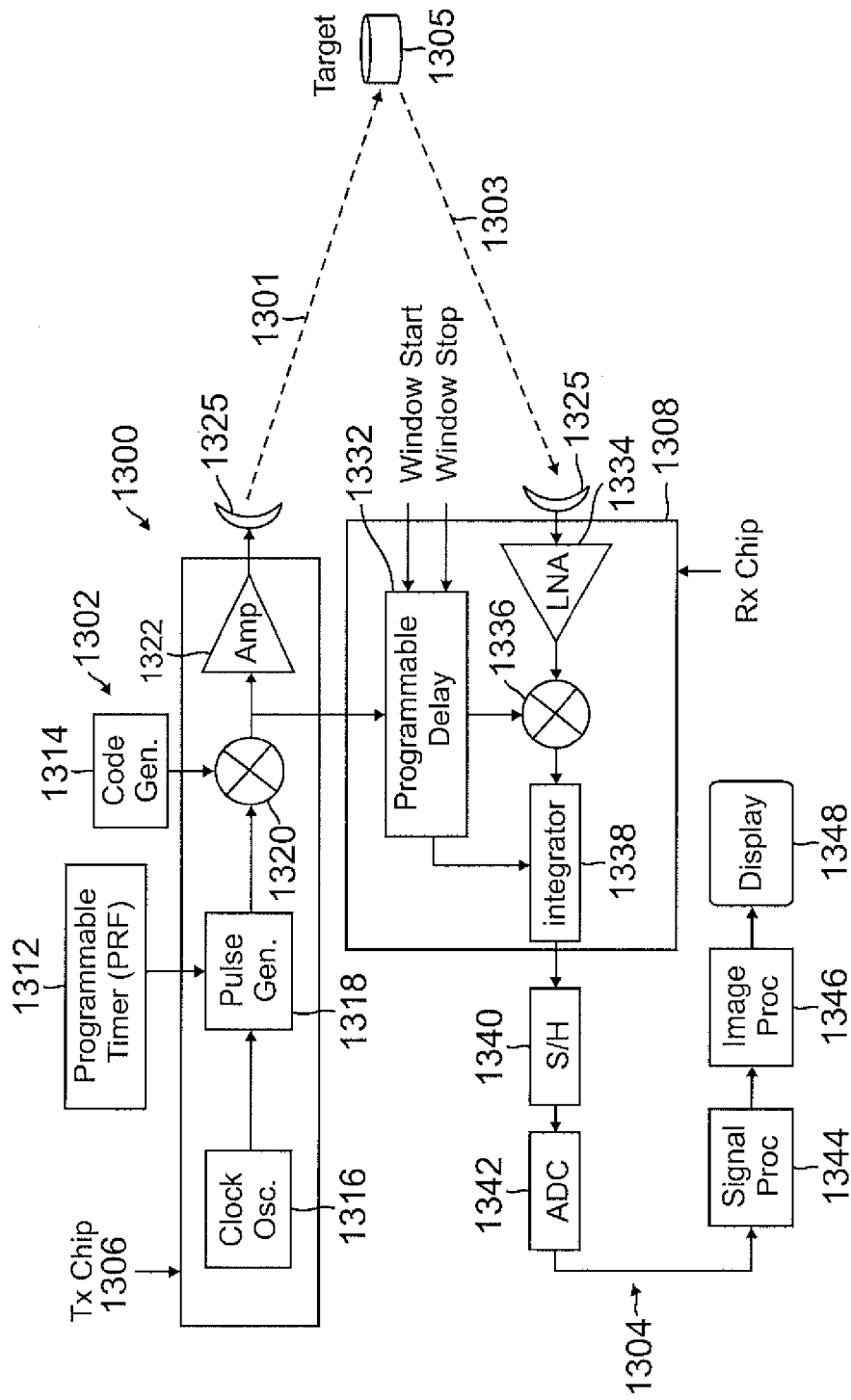
FIG. 2 is a system block diagram illustrating a radar sensor in accordance with an embodiment.

FIG. 2 illustrates a radar sensor 1300 in accordance with an embodiment. Radar sensor 1300 may include an impulse radar transmitter 1302 that transmits narrow radio frequency (RF) pulses at a certain pulse repetition frequency (PRF). For example, the transmitter of radar sensor 1300 may emit RF radiation 1301 in the form of rapid wideband (narrow width) radar pulses at a chosen pulse repetition frequency (PRF) in the 1-10 GHz band. The pulses can penetrate, for example, soil, glass, wood, concrete, dry wall, and bricks with varying attenuation constant. By choosing a PRF in the range of 10-100 MHz, for example, and appropriate average transmitter power, a surveillance range of approximately 5-50 feet can generally be achieved. The radar system 1300 may, for example, transmit Gaussian pulses as short as 100 pico-seconds wide with center frequency in the 1-10 GHz band.

In one or more embodiments, the UWB millimeter-wave radar sensor system 100 may operate with sub-200 picosecond (ps) bipolar pulses. The sensor 1300 may utilize the unlicensed 1-6 GHz band up-converted and down-converted to V-band (e.g., 60 GHz). An adjustable PRF in the range of 1-10 MHz may achieve an unambiguous range of up to 50-100 m. The range resolution may be about 30 millimeters (mm). The received power may be digitally processed to extract relevant information on the reflecting object (e.g., bullet or projectile. In another embodiment, sensor 1300 may operate at the W-band and using an active array module (e.g., antenna 1325) may address speeds of up to 50 m/sec for an incoming bullet at 200 m away from the aircraft 120 (e.g., helicopter).

Transmitter 1302 may employ a wafer scale antenna and wafer scale beam forming as disclosed in U.S. Pat. No. 7,312,763, issued Dec. 25, 2007, to Mohamadi and U.S. Pat. No. 7,548,205, issued Jun. 16, 2009, to Mohamadi and virtual beam forming as disclosed in U.S. Pat. No. 8,237,604, issued Aug. 7, 2012, to Mohamadi et al., all of which are incorporated by reference.

Radar sensor 1300 may include a radar receiver 1304 that performs the required signal processing on a reflected response (e.g., reflected pulses 1303) to construct a digitized representation of the target 1305 (e.g., a bullet or other projectile). In the receiver 1304, amplitude and delay information may be extracted and digitally processed. As shown in FIG. 2, many of the transmitter 1302 functions may be implemented on a transmitter chip 1306 and many of the receiver 1304 functions may be implemented on a receiver chip 1308. A general block diagram of transmit and receive functions are depicted in FIG. 2.

As shown in FIG. 2, radar sensor 1300 may include modules for performing the functions, including: programmable timer 1312 for establishing the PRF; code generator 1314 for providing modulations to the signal 1301; clock oscillator 1316 for providing the RF carrier frequency signal; pulse generator 1318 for forming (or generating) narrow radar pulses based on timing from programmable timer 1312; multiplier 1320 for combining the generated radar pulses with the output of code generator 1314; power amplifier 1322 for amplifying the pulse signal and feeding it to antenna 1325, which may a wafer scale, beam forming antenna as described above. Although two antennas 1325 are shown in FIG. 2 for clarity of illustration, use of a circulator (not shown) as an isolator switch may enable use of a single antenna 1325 for both transmit and receive. Antenna 1325 may include an active array antenna implemented using wafer scale antenna module and virtual beam forming in ultra wideband systems technologies.

Virtual beam forming in ultra wideband systems is disclosed by U.S. Pat. No. 8,237,604, issued on Aug. 7, 2012 to Mohamadi et al.; wafer scale antenna module (WSAM) technology is disclosed by U.S. Pat. No. 7,884,757, issued Feb. 8, 2011, to Mohamadi et al. and U.S. Pat. No. 7,830,989, issued Nov. 9, 2010 to Mohamadi, all of which are incorporated by reference.

Radar sensor 1300, as shown in FIG. 2, may further include modules for performing functions, including: programmable delay timer 1332, coordinated with the transmitted signal 1301, as indicated by the arrow between transmitter chip 1306 and receiver chip 1308, for providing timing, e.g., window start and window stop, for receiving reflected pulses 1303; a low noise amplifier 1334 for receiving the reflected pulses 1303; multiplier 1336 for combining the received reflected pulses 1303 and the window delay from programmable delay timer 1332; integrator 1338; sample and hold 1340, analog to digital converter 1342; signal processor 1344 (e.g., a digital signal processor or DSP); image processor

1346; and display 1348. Display 1348 may be as shown for example in FIG. 10 or FIG. 11.

Figure 3A:
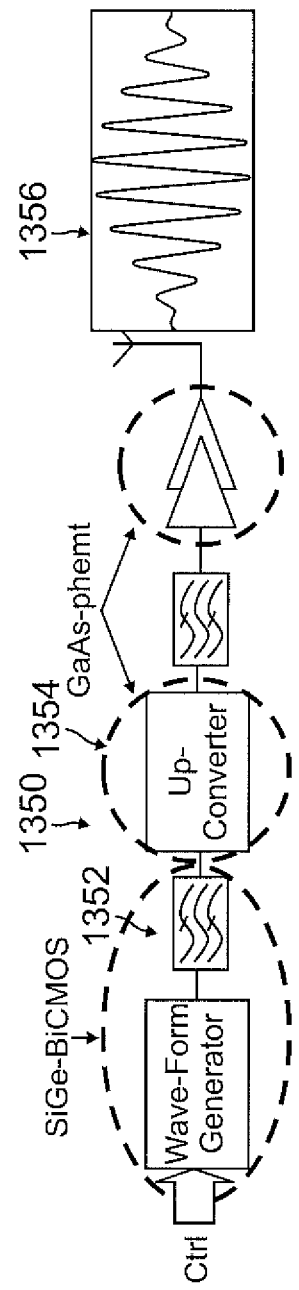
FIGS. 3A and 3B are system block diagrams illustrating alternative implementations of radar transmitters for the sensor of FIG. 2.
Figure 3B:
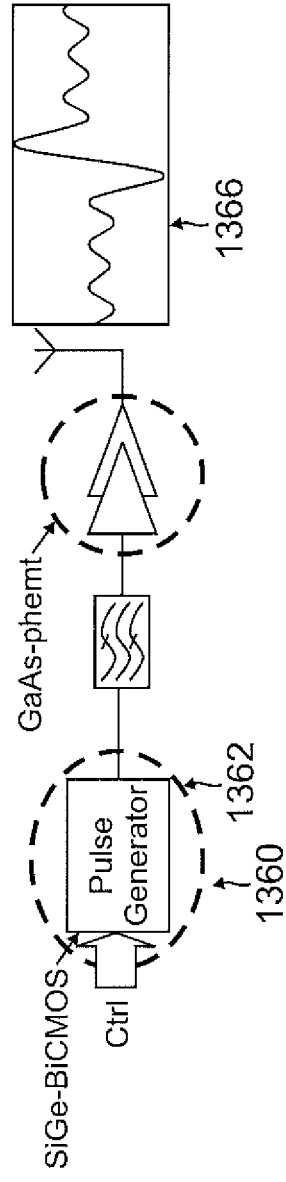

FIGS. 3A and 3B illustrate alternative implementations of radar transmitters (e.g., radar transmitter 1302) for radar sensor 1300 of FIG. 2, in accordance with one or more embodiments. In one implementation strategy, shown in FIG. 3A, the pulse shaping 1352 is performed in the intermediate frequency (IF) bands, and the resulting pulse is up-converted 1354 to RF frequencies resulting in a "carrier-inclusive" UWB-pulse or burst 1356. This strategy may provide versatility in defining carrier frequency for transmission with more flexibility in wave-pulse form definition.

In another implementation strategy, shown in FIG. 3B, the pulse generation 1362 is performed in the RF bands resulting in a "carrier-less" UWB-pulse 1366. This strategy may use less complex circuitry and may have lower power dissipation.

As indicated in FIGS. 3A and 3B, either implementation may employ indium phosphid high electron mobility transistor (HEMT), silicon complementary metal oxide semiconductor (CMOS) or silicon-germanium (SiGe) bipolar-complementary metal oxide semiconductor (BiCMOS) technologies. Also as indicated in FIGS. 3A and 3B, the up-converter and power amplifier stages of either implementation may employ gallium-arsenide (GaAs) pseudomorphic high electron mobility transistor (pHEMT) technologies.

Figure 4:
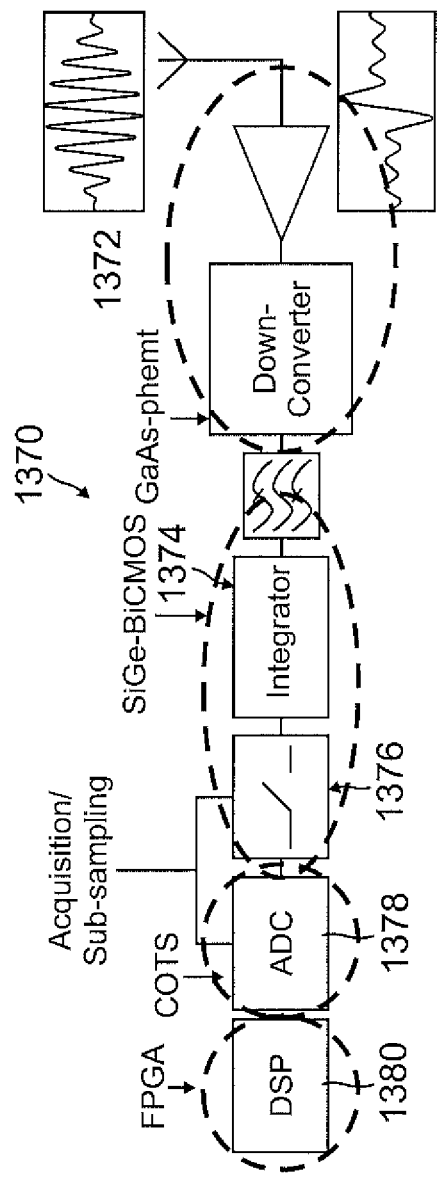
FIG. 4 is a system block diagram illustrating an alternative embodiment of a radar receiver for the sensor of FIG. 2.

FIG. 4 illustrates a radar receiver front-end 1370 for the radar sensor 1300 of FIG. 2, in accordance with an embodiment. Either type (as shown in FIG. 3A or 3B) of the transmitted pulse 1356 or 1366 may be received by the radar receiver front-end 1370. The amplified (and down-converted at down-converter 1372) received signal is integrated 1374 to increase the signal to noise ratio (SNR). A sub-sampling track and hold circuit 1376 is used to create the "base-band" or "low-IF" signal. An analog to digital convertor (ADC) 1378 creates the digital representation of the base-band signal and forwards the data streams to digital signal processing (DSP). Due to the wide-band character of the analog RF signals, the filters as well as the custom made high frequency circuits of the receiver may be designed with constant group-delay.

As indicated in FIG. 4, the ADC 1378 may be implemented from commercially available components, also referred to as commercial-off-the-shelf (COTS) and the DSP 1380 may be implemented using field programmable gate array (FPGA) technology. As indicated in FIG. 4, implementation of radar receiver front-end 1370 may also employ, as with the implementation of the radar sensor 1300 transmitter, silicon-germanium SiGe BiCMOS technologies and GaAs pHEMT technologies.

A deterministic relation between reflected power and phase of a "carrier-included" pulse form, when reflected by media with different dielectric constants, indicated by measurements on a COTS-based V-band system and enhanced performance indicated when utilizing polarized antennas can be taken advantage of in a scenario in which a single transmitter (e.g., transmitter 1350) generates a polarized wave, and two receivers (e.g., receiver 1370), in parallel, process the received signals at two different polarizations. Thus, one embodiment may include two (not shown) "identical" down converting hardware-paths in the RX-block (e.g. receiver 1370).

Figure 5:
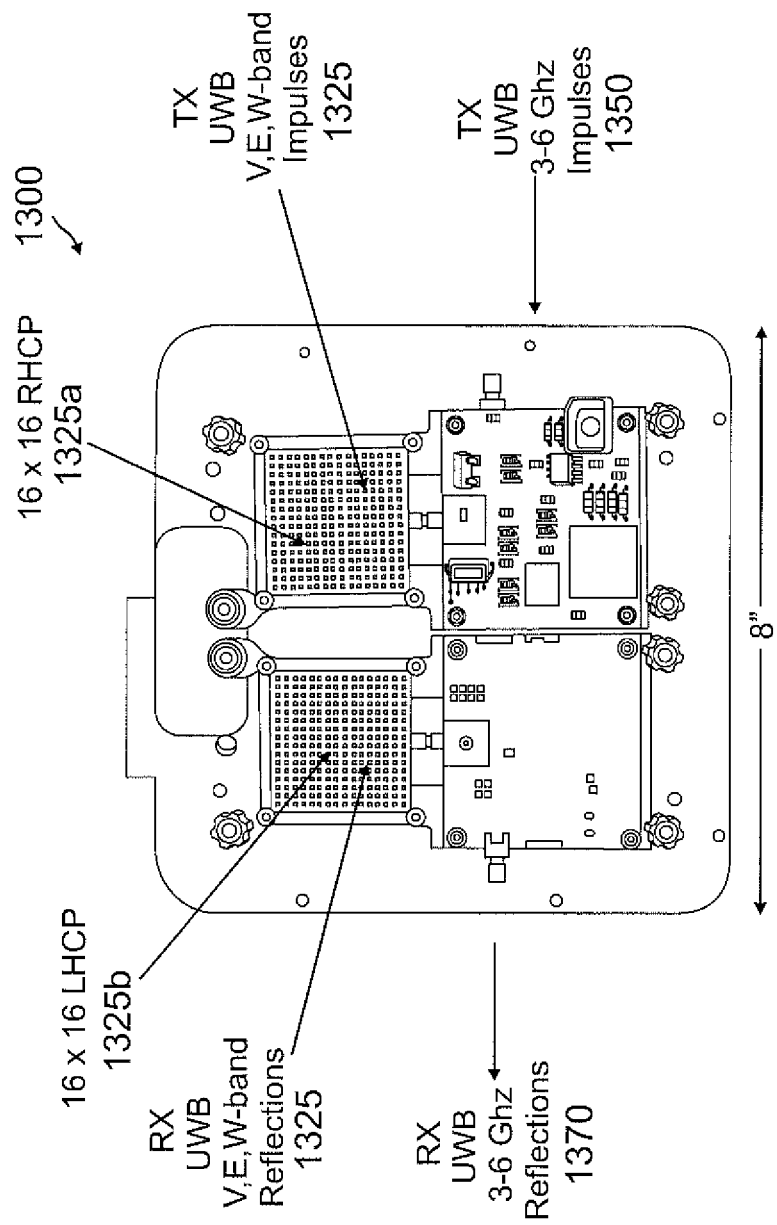
FIG. 5 is perspective view showing an example of a physical layout for part of a radar sensor system, in accordance with an embodiment.

FIG. 5 shows an example of left-hand circularly polarized (LHCP) and right-hand circularly polarized (RHCP) 16-by-16 element antenna arrays 1325 for a radar sensor 1300 of a radar sensor system 100, in accordance with an embodiment. Although two antenna arrays 1325 are shown in FIG. 5, use of a circulator (not shown) as an isolator switch may enable use of a single antenna 1325 for both transmit and receive. In one embodiment, the transmit array 1325a and the receive array 1325b may be separately implemented as shown in FIG. 5.

Each active antenna array 1325 (LHCP and RHCP) may be implemented in a planar surface to provide higher signal resolution and phase contrast with minimal thickness of the arrays. LHCP and RHCP planar active array antennas 1325 may provide improved suppression of side lobes and may address a critical factor for clear radar imaging as a result of antennas with high contrast efficiency (e.g., greater than 95%). As seen in FIG. 5, overall side dimension of a sensor unit with two antenna arrays may be no greater than 8 inches; thus, the side dimension of each planar active antenna array 1325 may be less than 4.0 inches. With formation of the beam occurring in the spatial combining and power amplifier and low noise amplifiers, and use of LHCP and MCP arrays cross coupling of a high power TX to RX input may be eliminated. As a result, a high gain (42 dBi) array 1325 can be used with 4.0 inch per side dimensions (as seen in FIG. 5) that can be placed in a 6.0 inch (or less) diameter substrate. Due to the dual use of antenna arrays 1325a and 1325b as combiner as well as beam former, the antenna module size can be substantially smaller, lighter, and easier to install than conventional radar sensors, especially for operation at the W-band.

Figure 6A:
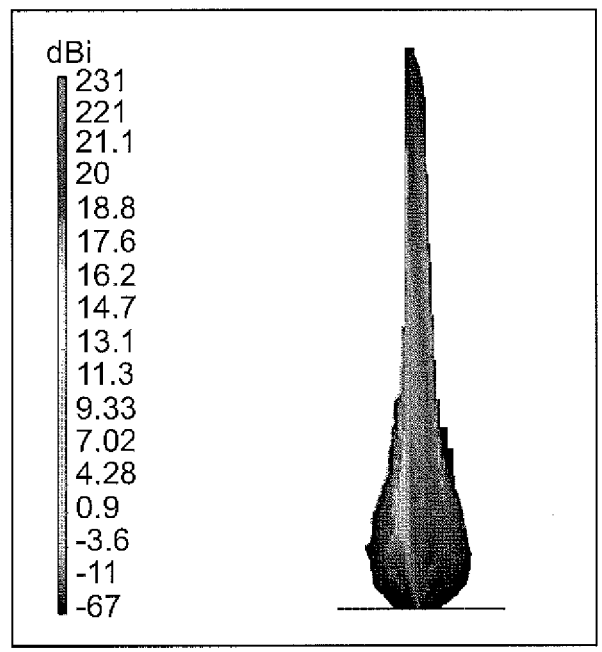
FIG. 6A is a graph showing a radiation pattern for a 32-by-32 element antenna array tile, in accordance with an embodiment.

FIG. 6A is a graph showing a radiation pattern for a 32-by-32 element antenna array, which may be implemented as an enhancement of a 16 by 16 array as shown in FIG. 5, in accordance with an embodiment. As described above, embodiments may include beam forming and spatial power combining that enables very high antenna array gain and very narrow beam width with superb pointing accuracy, as shown by FIG. 6A, for producing one dimensional (1-D) image, horizontal (or vertical) electronic scanning of the bullet (or other projectile) at extended ranges.

Figure 6B:
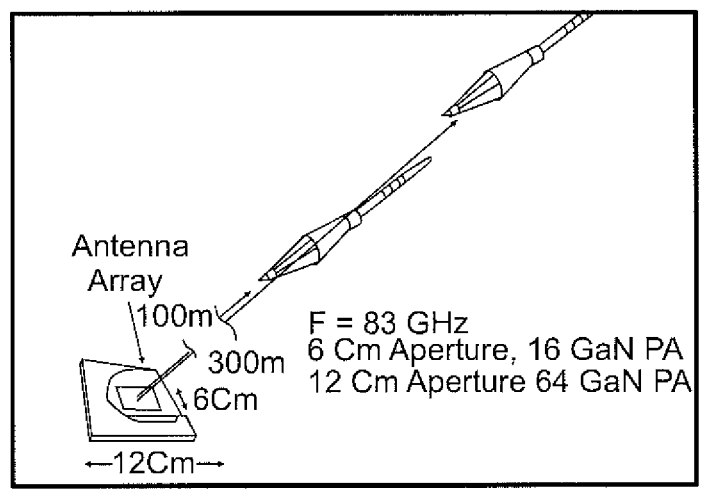
FIG. 6B is a diagram showing an example of trajectory detection ranges for different radar sensor apertures, in accordance with an embodiment.

FIG. 6B is a diagram showing an example of trajectory detection ranges for different radar sensor apertures. Each 16-by-16 (256) element antenna array 1325 may be implemented with 16 power amplifiers or low noise amplifiers to provide a "tile". A larger array may be made up of four 16-by-16 element antenna array "tiles", such as a 32-by-32 (1024) element array with 64 power amplifiers. FIG. 6B illustrates a comparison of beam forming and target (e.g., projectile) range detection at W-band (e.g., 83 GHz) showing a 100 m range for a 16-power amplifier array (6 centimeter (cm) aperture) and a 300 m range for a 64 power amplifier array (6 centimeter (cm) aperture).

Equation 1 describes the relationship between the sensor's (e.g., sensor 1300) transmitter power, target distance, target cross section, and the sensor's receiver sensitivity. To enhance the sensitivity for detecting objects with small cross section launched at the aircraft 120 (e.g., helicopter), additional process gain of 30 dB or more may be obtained from a 1024 times correlation chip integrated into the electronics of the UWB sensor (e.g., in signal processing module 1344).

Equation (1)

$$SNR = \frac{E_S}{E_N} = \frac{P_S \tau_p}{kT_0 F_n} = \frac{P_T G_T G_R \lambda^2 \sigma}{(4\pi)^3 R^4 kT_0 F_n L} \tau_p \text{ joule/joule or } \frac{w-s}{w-s} \text{ or } w/w \quad (1)$$

where:
$P_T$=transmit power,
$G_T$=TX antenna gain,
$G_R$=RX antenna gain,
$\lambda$=wavelength, σ=effective cross section,
$\tau_p$=period,
B=bandwidth,
R=antenna distance to target,
$kT_0$=noise power,
$F_n$=noise factor, and
L=radar loss.

A sensor 1300 with a 32-by-32 (1024) element active antenna array with 16 power amplifiers (which may be implemented, for example, using Gallium Nitride (GaN)) may operate at the W-band and may have a foot print (physical size) of no more than 0.5 ft.-by-0.5 ft. Tracking of a supersonic bullet can be achieved with very high resolution at around 100 m from the sensor 1300 of the aircraft 120 (e.g., helicopter). For example, SNR at 100 m may be about 27 dB compared to −13 dB at 1000 m and −25 dB at 2000 m. With an additional 10 dB of gain at the receiver input amplifier, a 6-bit ADC (e.g., ADC 1342 or ADC 1378) can be employed to sub-sample the reflected impulses at a 1.2 MHz repetition rate.

The foregoing sensitivity analysis can be further expanded to detect objects with larger cross section, such as a rocket propelled grenade (e.g., RPG-7). The detected power may be used to classify the incoming objects. For an identical sensor (e.g., sensor 1300 with the same TX power, antenna arrangement, and RX sensitivity), the presence of the 70 mm diameter RPG warhead can be clearly traced (e.g., about the same SNR of 27 dB) to the sensor 1300 from a distance of 300 m. The longer range detection capability not only can trace the location of the launcher, it can also provide alarm systems for evasive actions in case the pilot has entered an airspace at unsafe altitude.

Figure 7:
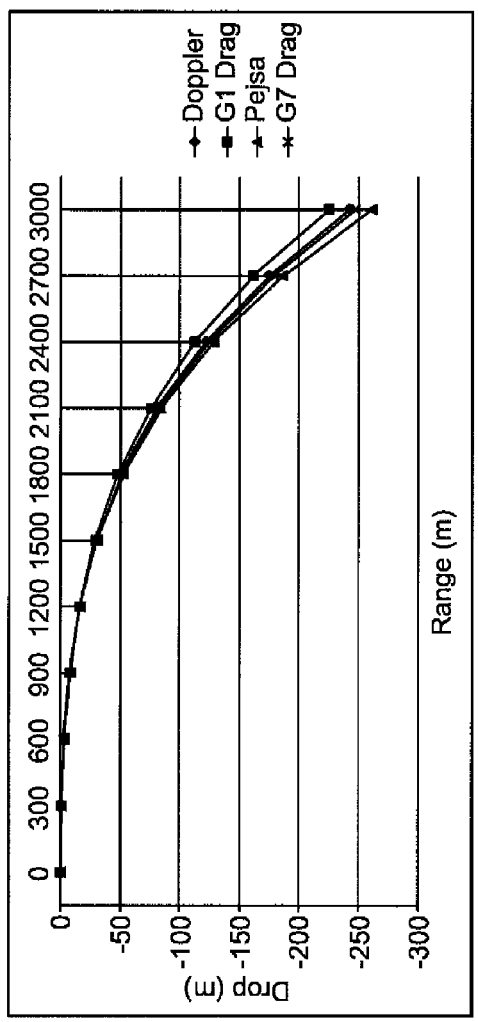
FIG. 7 is a graph comparing different models of external ballistic behavior according to one or more embodiments.

FIG. 7 is a graph comparing different models of external ballistic behavior. In accordance with one or more embodiments, data may be collected for various supersonic cartridges and corresponding weight and bullet information. Data may be collected, for example, for .338 Lapua, .408 CheyTac, .416 Barrett, and .50 BMG (.50 Browning Machine Gun). Data may include several attributes such as bullet weight, base diameter, height, muzzle velocity, supersonic range, and muzzle energy, for example. Data may be compiled to derive a model that can predict height of a bullet that can travel at supersonic speeds. The model may be used for range calculation and safety zone of an aircraft 120 (e.g., helicopter) that can monitor snipers at extended ranges and report the sniper's location, for example, using global positioning system (GPS) coordinates on display 1348 (see FIG. 11) or a conventional display such as Googlemap™.

Several drag curve models optimized for standard projectile shapes may be considered. The resulting fixed drag curve models may be employed to derive an accurate model that can predict the vertical range that a supersonic bullet can travel.

Development of a model may predict external ballistic behavior that can yield differing results with increasing range and time of flight of the projectile. To illustrate the variability of external ballistic behavior predictions, available data from the Lapua Scenar GB528 19.44 gram (g) (300 grains (gr)) very-low-drag rifle bullet with ballistic coefficient (BC) of 0.785 fired at 830 m/s (2723 ft./s) muzzle velocity under International Standard Atmosphere sea level conditions (air density ρ=1.225 kg/m³), Mach 1=340.3 m/sec was considered. The model predicts the projectile velocity and time of flight from 0 to 3,000 m (0 to 3,281 yd) (see FIG. 7), using several standard projectile models designated as: G1 or Ingalls; G2 (Aberdeen J projectile); G5 (short 7.5° boat-tail, 6.19 calibers long tangent ogive); G6 (flatbase, 6 calibers long secant ogive); G7 (long 7.5° boat-tail, 10 calibers long tangent ogive); G8 (flatbase, 10 calibers long secant ogive); and GL (blunt lead nose).

G1, G7, and Doppler radar test derived drag coefficients (Cd) predictions may be made using QuickTARGET™ Unlimited, Lapua Edition. Pejsa predictions calculated by Lex Talus Corporation, may be made using Pejsa-based ballistic software with the slope constant factor set at the 0.5 default value.

FIG. 7 illustrates the validity of the models based on the compiled data. The drag coefficient and terminal velocity may be extracted and used in conjunction with the 419 gr .408 CheyTac™ cartridge, for example, to predict vertical range (e.g., max height) of 1558 m, terminal velocity 80.5 m/s, time to max height 12.1 sec with drag coefficient 0.75, cross section $8.49462 \times 10^{-5}$ m², bullet mass 0.0272 kg, using acceleration due to gravity 9.8 m/sec² and air density 1.29 kg/m³.

Figure 8:
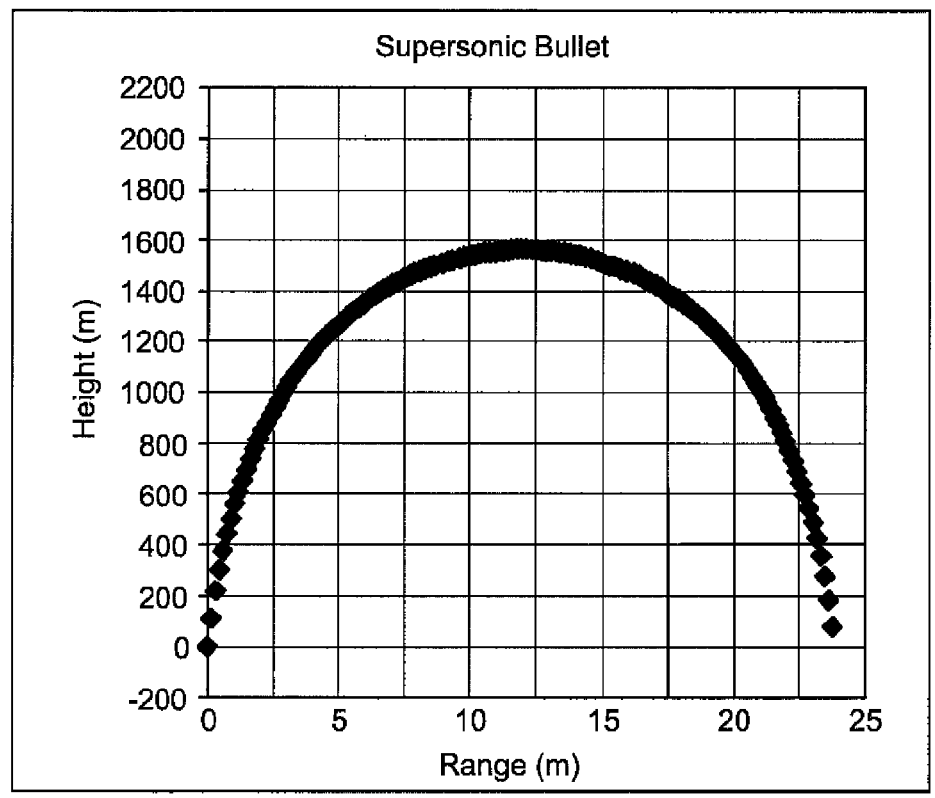
FIG. 8 is a graph showing an example of a predicted trajectory for a ballistic projectile according to one or more embodiments.

FIG. 8 is a graph showing an example of a predicted trajectory for a ballistic projectile, for example, according to a model as described above. The extracted parameters may be used with NASA's trajectory equations (2-4) to model the bullet path.

$$V/Vt=(Vo-Vt*\tan(g*t/Vt))/(Vt+Vo*\tan(g*t/Vt)) \quad (2)$$

$$y=(Vt^2/(2*g))*\ln((Vo^2+Vt^2)/(V^2+Vt^2)) \quad (3)$$

$$x=(Vt^2/g)*\ln((Vt^2+g*Uo*t)/Vt^2) \quad (4)$$

where:
t=time,
Vt=vertical velocity at time t,
Vo=initial vertical velocity,
Uo=initial horizontal velocity,
g=acceleration due to gravity,
y=vertical coordinate, and
x=horizontal coordinate.

Using equations 2, 3, and 4 the projectile trajectory can be plotted using an x-y coordinate graph (e.g., as shown in FIG. 8) for maximum altitude that a projectile (e.g., bullet) can hit. The projectile of maximum height based on Vo=844 m/sec and Uo=10 m/sec is shown in FIG. 8.

Figure 9:
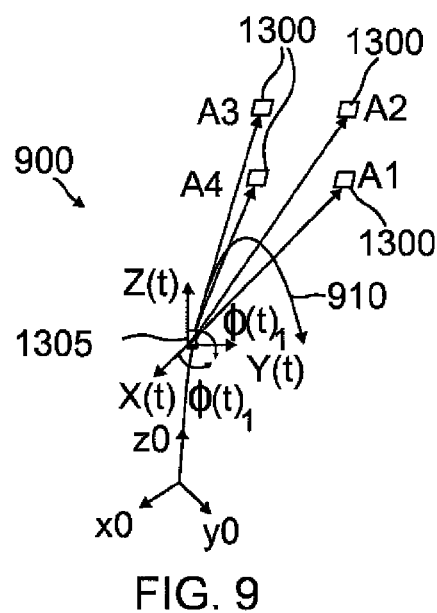
FIG. 9 is an x-y-z coordinate system illustrating an example of trajectory calculation using multiple sensors according to one or more embodiments.

FIG. 9 illustrates an example of an x-y-z coordinate system 900 for trajectory calculation of a target 1305 (e.g., projectile) using multiple sensors 1300 according to one or more embodiments. For three dimensional (3-D) image construction, the target 1305 may be scanned from different angles which can be achieved by multiple-antenna radar using sensors 1300 with multiple locations of antennas A1, A2, A3, and A4, as shown in FIG. 9. Using the multiple scan angles and knowledge of the relative positions of antennas A1-A4, a triangulation calculation can be made for the position of target 1305 relative to the positions of antennas A1-A4, providing greater accuracy or resolution of the target 1305 position for calculating trajectory 910 of the target 1305. Trajectory 910 may be used for 3-D image construction and display, for example, as shown in FIG. 11. Multiple-antenna beam forming and triangulation may also be employed for two-dimensional (2-D) display of the target as shown in FIG. 10.

Figure 10:
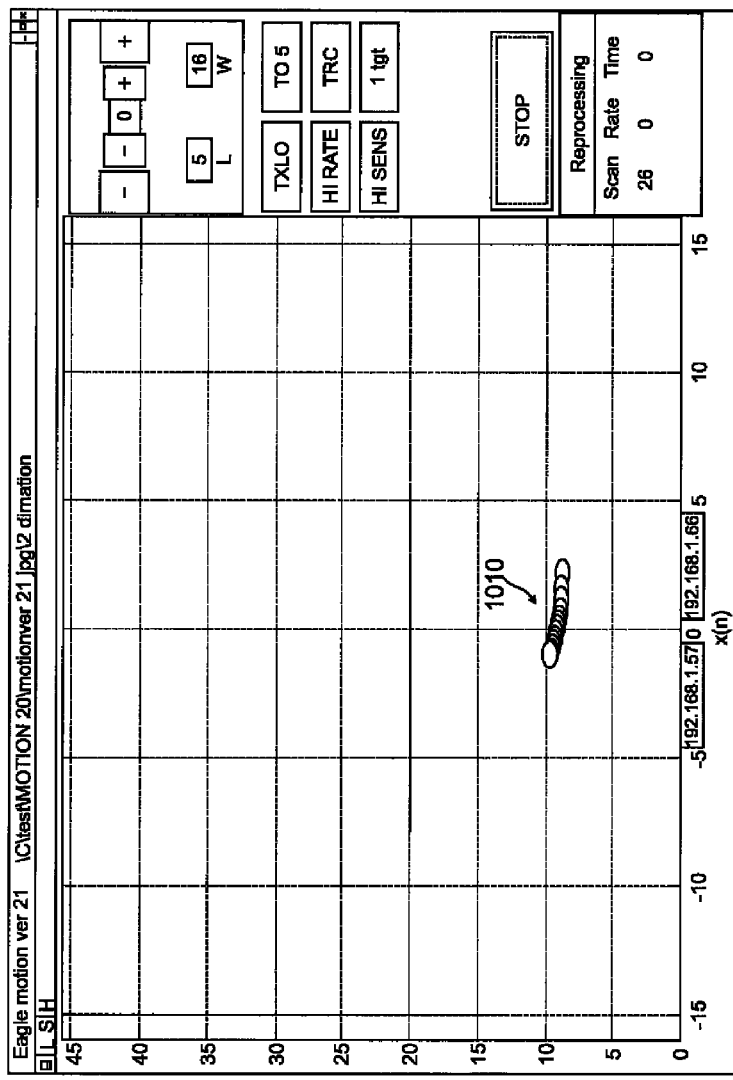
FIG. 10 is an example of an image display for sensing ballistic projectile trajectories according to one embodiment.
Figure 11:
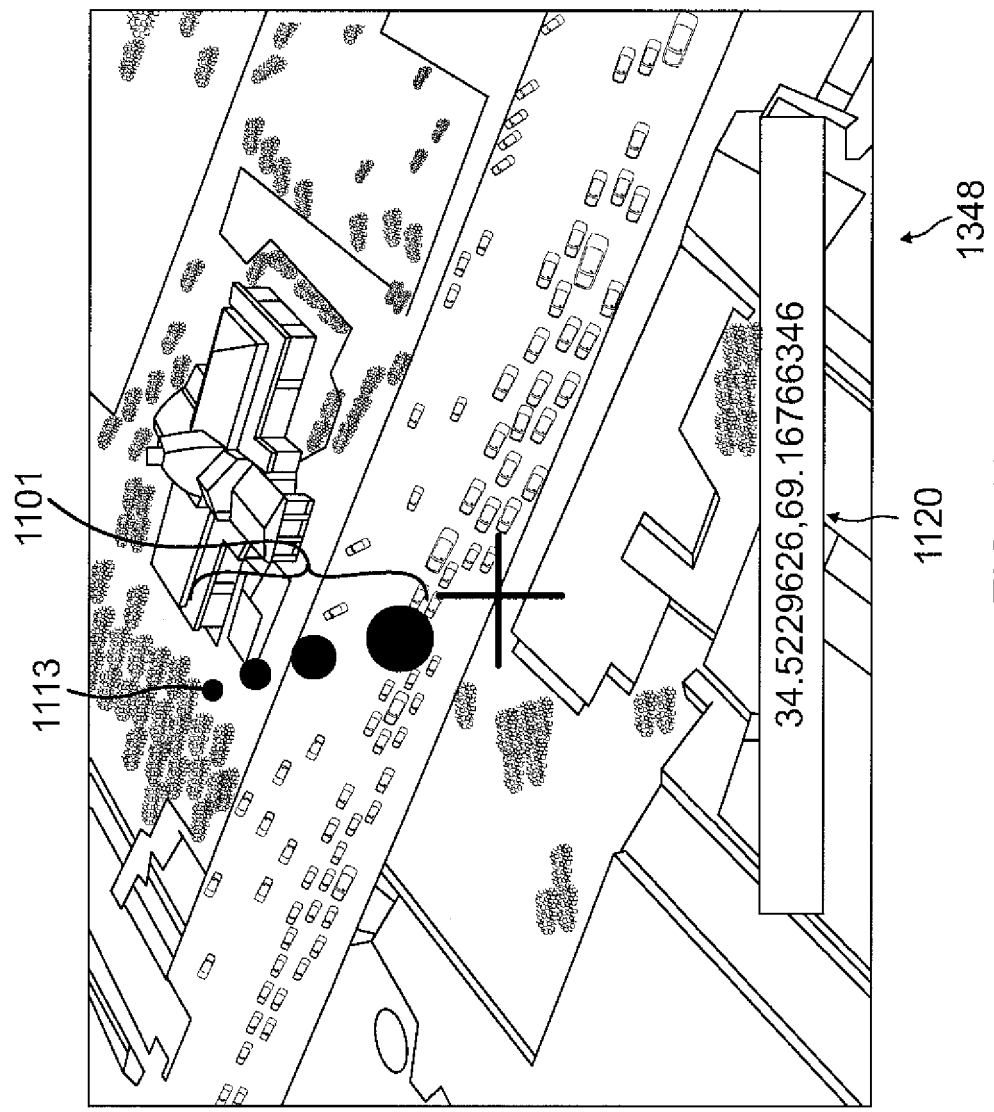
FIG. 11 is an example of an image display for combining ballistic projectile trajectory sensor information with an optical or thermal image according to one embodiment.

FIG. 10 is an example of an image display 1348 for sensing ballistic projectile trajectories according to an embodiment. Display 1348 may be output, for example, from image processor 1346 shown in FIG. 2. An example trajectory 1010 for a target 1305 is shown in FIG. 10. Radar imaging system 100 may, for example, implement image construction algorithms in DSP (e.g., signal processor 1344) and yield a 1D or 2D image of proximity targets 1305. An antenna array (e.g., planar active antenna array 1325) with 1024 elements may provide at least 36 dB gain with less than 2-degree beam width. The high resolution scanning and precise mapping of targets 1305 may then be achieved by spatial calculation of the bullet's trajectory using four sensors (as shown in FIGS. 1 and 9). The data may then be fused into an optical image as depicted in FIG. 11.

FIG. 11 is an example of an image display 1348 for combining ballistic projectile trajectory sensor information with an optical or thermal image according to an embodiment. The light weight and compact size of sensors 130 may provide a high degree of versatility for installation under or on the side of an aircraft 120 (e.g., at locations 110 for mounting sensors 1300 on a helicopter, as shown in FIG. 1). Sensor function can be augmented, for example, with cameras or other optical or thermal imaging sensors such as forward looking infra-red (FLIR) at sensor mounting locations 110.

The radar sensor data can then be fused with the optical or thermal imaging data and the trajectory 1010 (see FIG. 10) information of the projectile to provide a trajectory display 1101 on display 1348 and display the probable source location 1113 of the projectile (e.g., target 1305) on display 1348. Display 1348 may also display additional information as shown in FIG. 11, such as GPS coordinates 1120 for the source location 1113 of the projectile. Similarly, a night vision view can be selected using a FLIR high resolution imaging device, mounted, for example, at one or more of sensor mounting locations 110.

Embodiments described herein illustrate but do not limit the disclosure. It should also be understood that numerous modifications and variations are possible in accordance with the principles of the present disclosure. Accordingly, the scope of the disclosure is best defined only by the following claims.

What is claimed is:

1. A system comprising:
a mobile platform;
an ultra-wideband (UWB) radar imaging system carried by the mobile platform, including:
  a plurality of radio frequency (RF) sensors; and
  an imaging processor in communication with the plurality of radio frequency (RF) sensors, wherein:
  each RF sensor is configured to transmit a high resolution radar signal using an array of power amplifiers and corresponding antenna arrays to form spatial power combining and beam forming; and to receive reflections from a projectile using an array of low noise amplifiers and corresponding antenna arrays to form spatial power combining from the reflections; and
  radar sensor data from the plurality of sensors is processed by the imaging processor to provide trajectory information of the projectile on a display.

2. The system of claim 1, wherein:
beam forming from at least two of the RF sensors overlaps to provide triangulation information for locating the projectile.

3. The system of claim 1, further comprising:
optical or thermal imaging sensors that provide optical or thermal imaging data to the imaging processor, wherein:
the radar sensor data is fused by the imaging processor with the optical or thermal imaging data and the trajectory information of the projectile to provide a probable source location of the projectile on a display.

4. The system of claim 1, wherein at least one of the sensors includes:
a high gain antenna array, wherein the gain is at least 39 dBi, and
the high gain antenna array has side dimensions less than 4.5 inches.

5. The system of claim 1, wherein at least one of the sensors includes:
an antenna array comprising a right-hand circularly polarized (RHCP) antenna array and a left-hand circularly polarized (LHCP) antenna array in a planar surface.

6. The system of claim 1, wherein:
the transmitter and receiver of at least one of the RF sensors operate at a carrier frequency of at least 40 GigaHertz (GHz) and less than 110 GHz.

7. The system of claim 1, wherein:
the mobile platform is an aircraft.

8. A method comprising:
carrying an ultra-wideband (UWB) radar imaging system by a mobile platform, wherein the UWB radar imaging system includes a plurality of radio frequency (RF) sensors;
transmitting a high resolution radar signal using an array of power amplifiers and corresponding antenna arrays to form spatial power combining and beam forming from each RF sensor; and receiving reflections using an array of low noise amplifiers and corresponding antenna arrays to form spatial power combining from the reflections at each RF sensor;
processing radar sensor data from the plurality of sensors by an imaging processor for detecting a ballistic projectile; and
providing trajectory information of a detected ballistic projectile on a display.

9. The method of claim 8, further comprising:
overlapping the beam forming from at least two of the RF sensors to provide triangulation information for locating the detected ballistic projectile.

10. The method of claim 8, further comprising:
providing optical or thermal imaging data to the imaging processor from optical or thermal imaging sensors; and
fusing the radar sensor data with the optical or thermal imaging data and the trajectory information of the detected ballistic projectile to provide a probable source location of the detected ballistic projectile on a display.

11. The method of claim 8, further comprising:
spatial power combining and beam forming, at one or more of the RF sensors, from a high gain antenna array, with side dimensions less than 4.5 inches, wherein the gain is at least 39 dBi.

12. The method of claim 8, further comprising:
spatial power combining and beam forming, at one or more of the RF sensors, from an antenna array comprising right-hand circularly polarized (RHCP) and left-hand circularly polarized (LHCP) antenna arrays in a planar surface.

13. The method of claim 8, further comprising:
operating the transmitter and receiver of at least one of the RF sensors at a carrier frequency of at least 40 GigaHertz (GHz) and less than 110 GHz.

14. The method of claim 8, further comprising:
carrying the UWB radar imaging system by an aircraft, wherein the mobile platform is the aircraft.

* * * * *